H. REESE,
Assignor of one-fourth interest to T. L. REESE.
Railway Tie Fastening.
No. 9,292. Reissued July 13, 1880.
Fig. 2.
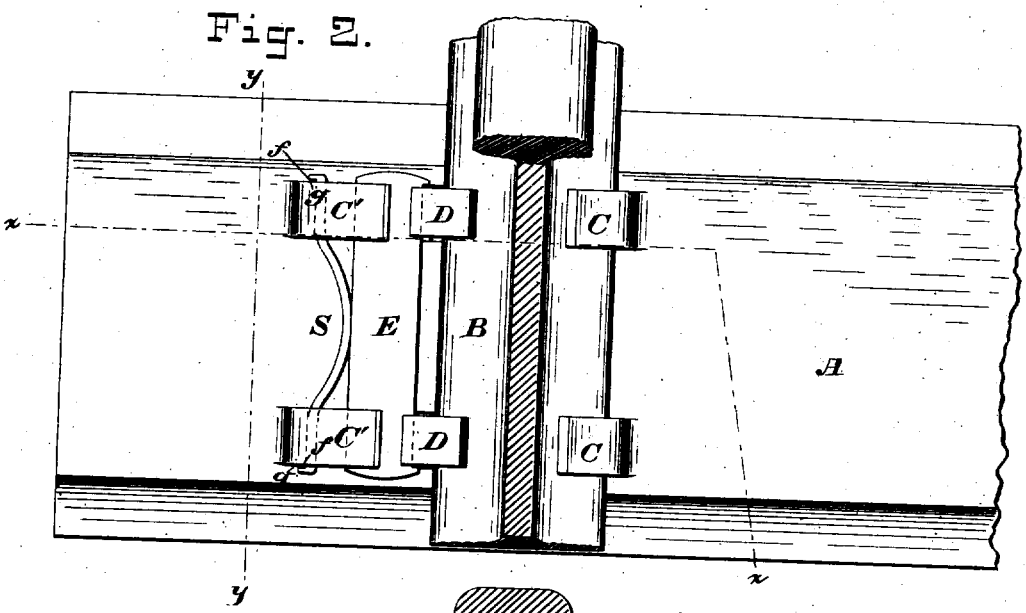
Fig. 3.
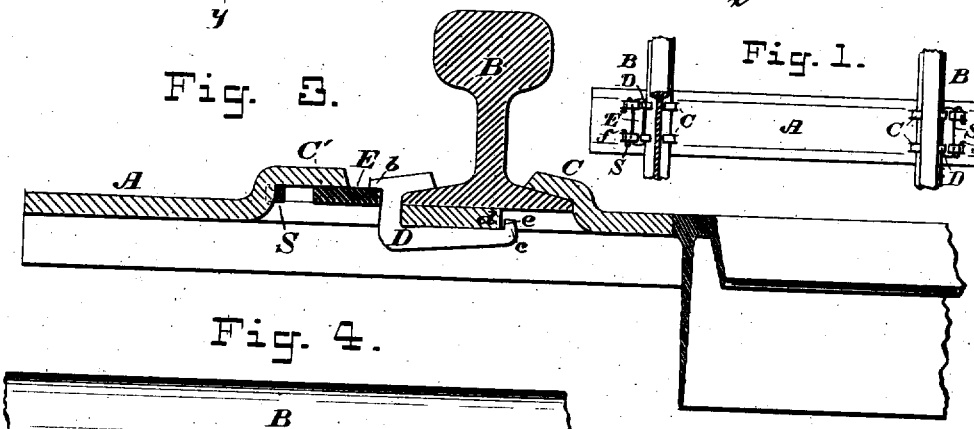
Fig. 1.
Fig. 4.
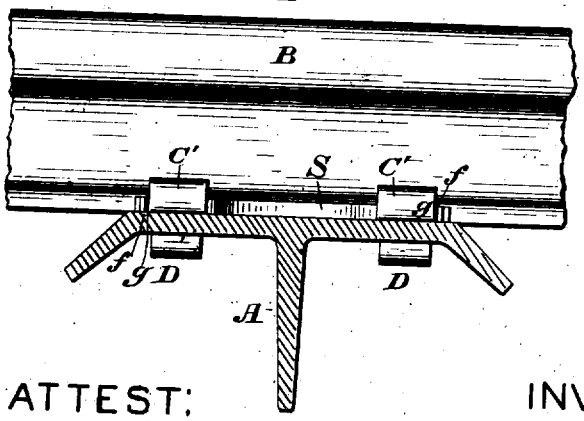
Fig. 5.
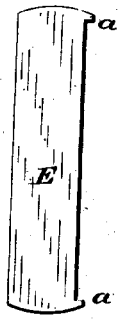
Fig. 8.
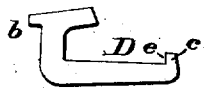
ATTEST:
Thomas F. McDonald.
Chas. Ebert Brown.
INVENTOR:
Henry Reese,
By his Attorneys,
Burke Fraser & Connett
N. PETERS, PHOTO-LITHOGRAPHER, WASHINGTON, D. C.

UNITED STATES PATENT OFFICE.

HENRY REESE, OF BALTIMORE, MARYLAND, ASSIGNOR OF ONE-FOURTH INTEREST TO THOMAS L. REESE, OF SAME PLACE.

RAILWAY TIE AND FASTENING.

SPECIFICATION forming part of Reissued Letters Patent No. 9,292, dated July 13, 1880.

Original No. 214,192, dated April 8, 1879. Application for reissue filed November 7, 1879.

*To all whom it may concern:*

Be it known that I, HENRY REESE, of Baltimore, in the county of Baltimore and State of Maryland, have invented an Improved Railway-Tie and Rail-Fastening, of which the following is a specification.

My invention relates to metallic railway-ties and the attachment of the rails thereto, and is an improvement upon the construction for which Letters Patent No. 163,254 were granted to me May 11, 1875, which embodied a T-shaped wrought-iron tie with lugs bent up therefrom to engage the base of the rail on one side, in connection with a clamp to embrace it and the tie on the other, the clamp being held in place against the rail by a wedge driven between it and other fixed lugs on the tie.

The object of my present invention is to provide a firm and reliable fastening for the rail, whose parts cannot be accidentally displaced or separated.

My invention consists, principally, of a tie provided with fixed lugs to overhang and engage the base of the rails on one side, removable clamps to embrace the base of the rails and a portion of the tie on the other side, confined in place against the rails by abutting shoulders, and springs arranged to exert their pressure upon the clamps to keep them pressed toward the fixed lugs, and thereby take up all looseness between the parts and prevent rattle.

It also further consists in certain details of construction and arrangement, all as will be fully hereinafter set forth.

In the drawings, Figure 1 is a general plan view of my tie with the rails in place on a small scale. Fig. 2 is a plan view, on a larger scale, of one end of the tie with a portion of one rail attached, the latter being partly in section. Fig. 3 is a vertical section of the same, taken in the plane of the line *x x* in Fig. 2. Fig. 4 is a vertical cross-section taken in the plane of the line *y y*, and Figs. 5 and 6 are detail views.

Let A designate the metal tie, which I have shown of T shape in cross-section; B B, the rails resting thereon; C C, fixed lugs overhanging one side of the bases of the rails and confining them to the tie; and D D, removable clamps extending under the top plate of the tie and over the other side of the bases of the rails, thus confining that side also to the tie.

One end of each clamp is formed with an abrupt face or shoulder, *e*, (shown in Figs. 3 and 6,) engaging a corresponding face or shoulder, *d*, on the tie A, (shown in Fig. 3,) and thus limiting the movement of the clamp away from the lug C.

S S are springs bearing against some parts of the tie and exerting their pressure upon the clamps D D to keep the latter pressed closely against the rails and the rails pressed closely against the lugs C C, thus taking up whatever looseness there may be in the fastening and preventing rattling.

I have shown the clamps D D arranged in pairs at each end of the tie, with one spring S to each pair of clamps, its pressure being transmitted to the clamps through the medium of a bridge-bar, E, which bears upon the clamps at its ends and receives the pressure of the spring at its center. The spring is interposed between the bar E and a pair of fixed lugs, C′ C′, on the tie, and is arranged close down to the surface of the tie, being confined thereto by the said lugs, which overhang it. The spring has shoulders *f f* formed upon it, which face in opposite directions, and are arranged to abut against opposite fixed shoulders or abrupt faces *g g*, to limit the longitudinal movement of the spring and prevent its becoming displaced.

I have shown the shoulders *g g* as being inner faces of the lugs C′ C′ in Fig. 1 and as the outer sides of the same in the remaining figures.

The bridge-bar E is prevented from moving endwise by means of shoulders *a a*, which face in opposite directions and abut against the sides of the clamps D D, and its vertical displacement is prevented by overhanging shoulders *b b* on the clamps D D, and also by the overhanging ends of the clamps C′ C′. The bar and spring are thus securely retained in position, so that they cannot be accidentally displaced, it being necessary to compress the spring before either can be removed.

As shown in Figs. 3 and 6, the shoulder or abrupt face *e* on the clamp D is formed as one side of an upwardly-projecting spur, *c*, which enters a slot in the top plate of the tie, the shoulder *d* consisting of one side of said slot.

The slight looseness which is necessary to admit of the clamp being applied to the rail and tie will ordinarily be taken up by the spring S, so that the shoulders *d e* will not ordinarily abut; but if at any time the spring-pressure should be removed from the clamp, either from accidental displacement or on account of the willful mischief of evil-disposed persons, the two shoulders will abut and prevent the lateral movement of the clamp away from the rail.

It will be seen that the spur *c* will be held up in the slot in the tie by the earth or ballast. The spur *c* projects upward into the slot in the tie, but not through it, the slot being formed beneath the base of the rail.

I am aware that a rail-clamp has been invented having an upturned toe or spur, which is bent back upon itself in hook form, and which passes through and projects above the tie and bears against a wedge which is driven across the top of the tie between the said toe and a fixed projecting shoulder on the tie.

The toe *c* of my clamp bears directly against the side of the slot in the tie, and does not require the insertion of a wedge.

In constructing and arranging my devices I may place the springs or clamps on either the outside of the rails, or between the same, as preferred, and I may make the springs of any desired form. I have shown two forms of spring in the drawings, that shown in Fig. 1 being bent back upon itself, while that in Fig. 2 has only a simple curve between its ends.

I claim as my invention—

1. A metallic railway-tie provided with fixed overhanging lugs C C, in combination with clamps D D, between which and said lugs the rails will be embraced, and by which they will be confined down to the tie, with means for preventing the movement of said clamps away from the rails, and with springs S S, arranged to exert their pressure against said clamps to force them toward the said lugs, and thereby take up looseness, substantially as set forth.

2. A metallic railway-tie provided with fixed overhanging lugs C C and shoulders *d d*, in combination with clamps D D, having shoulders *e* to engage said shoulders *d* on the tie, and with springs S S, arranged to exert their pressure against said clamps, and tending to force the shoulders *d e* apart, substantially as and for the purposes set forth.

3. A metallic railway-tie provided with fixed overhanging lugs C C and oppositely-facing shoulders *g g*, in combination with clamps D D, between which and the said lugs the rails will be embraced, with means for preventing the movement of said clamps away from the rails, and with springs S S, abutting against shoulders on the tie and exerting their pressure on the clamps to force the latter toward the lugs C, and being formed with oppositely-facing shoulders *f f*, engaging the shoulders *g g* on the tie, substantially as set forth.

4. A metallic railway-tie provided with fixed overhanging lugs C C, in combination with clamps D D, arranged in pairs, bridge-bars E E, bearing upon the clamps at their ends, and springs S S, arranged to press against the centers of the bridge-bars, substantially as set forth.

5. The combination, with the metallic tie A, having lugs C C and formed with slots beneath the rails, of the clamps D D, each formed with an upwardly-projecting spur, *c*, adapted to enter one of the said slots and to bear directly against the side thereof, substantially as and for the purposes set forth.

6. The combination, with the metallic tie A, having lugs C C, and with the springs S S, of the clamps D D, each formed with an upwardly-projecting spur, *c*, and with an overhanging shoulder, *b*, substantially as set forth.

In witness whereof I have hereunto signed my name in the presence of two subscribing witnesses.

HENRY REESE.

Witnesses:
G. E. SANGSTER,
WM. M. BENTON.